United States Patent
Ganues

(10) Patent No.: US 6,170,725 B1
(45) Date of Patent: Jan. 9, 2001

(54) TISSUE DISPENSER FOR USE IN A SPORTS AUTOMOBILE

(76) Inventor: William A. Ganues, 769 Stonebridge Run, Lithonia, GA (US) 30058

( * ) Notice: Under 35 U.S.C. 154(b), the term of this patent shall be extended for 0 days.

(21) Appl. No.: 09/236,857

(22) Filed: Jan. 25, 1999

(51) Int. Cl.[7] ................................................. B60R 7/00
(52) U.S. Cl. ........................ 224/539; 224/277; 224/540
(58) Field of Search ........................... 224/539, 540, 224/572, 277; 248/905; 206/233

(56) References Cited

U.S. PATENT DOCUMENTS 3,285,398 * 11/1966 Larkin .................................. 224/277
3,630,343 * 12/1971 Wohl .................................... 224/277
5,213,243 * 5/1993 Landon ................................. 224/277

FOREIGN PATENT DOCUMENTS 59-149839 * 8/1984 (JP) ....................................... 224/539

* cited by examiner

Primary Examiner—Gregory M. Vidovich
Assistant Examiner—Maerena W. Brevard
(74) Attorney, Agent, or Firm—William B. Noll

(57) ABSTRACT

A tissue dispenser assembly for late model CORVETTE, such as for the model years 1997 to 1999. The assembly includes a box-like housing for slidable receiving a conventional box of facial tissue, and a support adapter secured to at least a portion of the housing. The housing and adapter are positioned to lie contiguous with a pair of angled walls forming a part of the console of the CORVETTE.

4 Claims, 2 Drawing Sheets

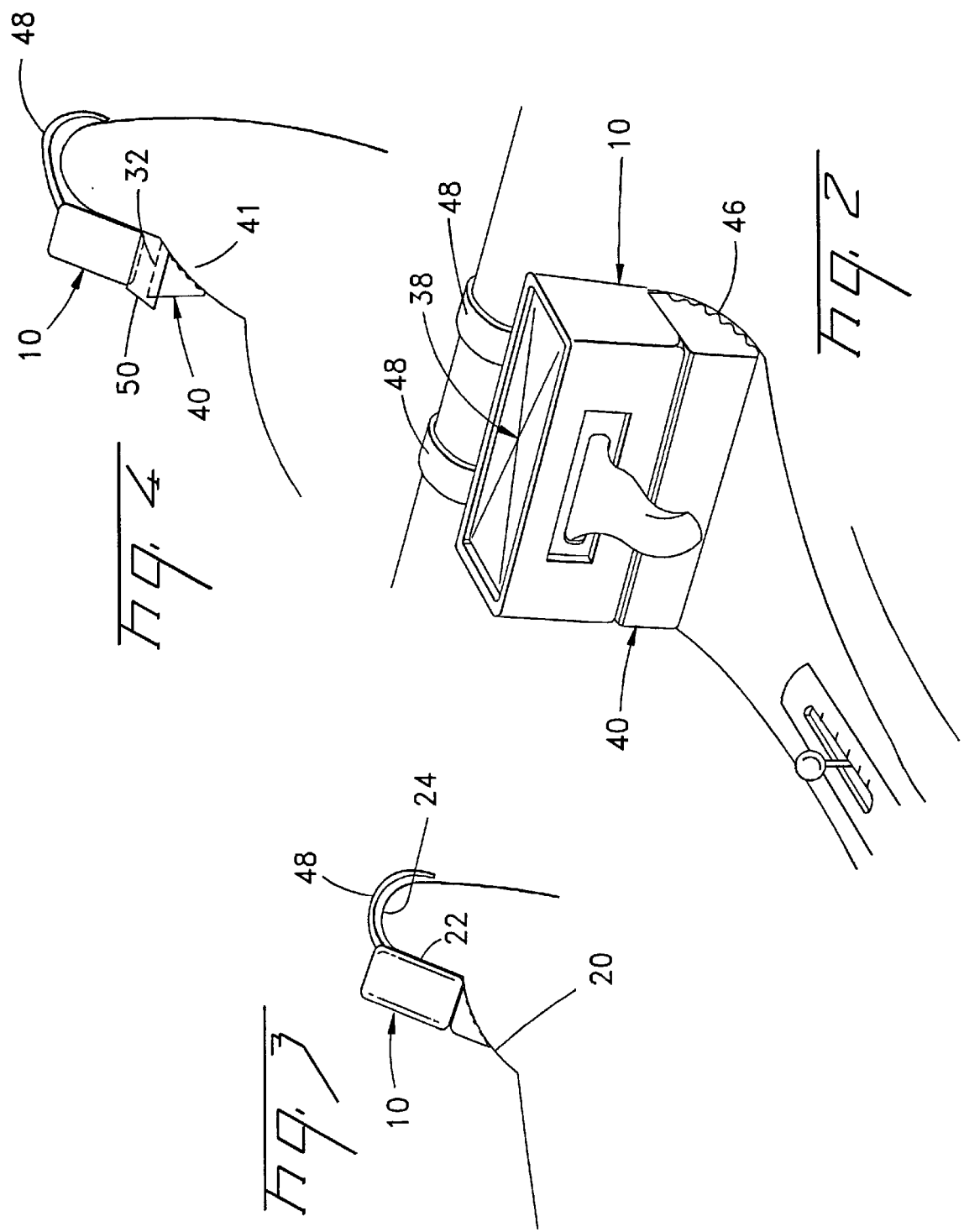

TISSUE DISPENSER FOR USE IN A SPORTS AUTOMOBILE

FIELD OF THE INVENTION

This invention is directed to the field of tissue dispensers for automobiles, particularly late model CORVETTES, a trademark of the General Motors Corporation for sports type automobiles, where the owner desires to incorporate the convenience of a tissue dispenser, yet retain the customizing and aesthetic features of his CORVETTE.

BACKGROUND OF THE INVENTION

The present invention relates to a tissue dispenser for a late model Chevrolet CORVETTE, such as for the years 1997 to 1999, where the dispenser is mounted facing the driver on the console adjacent the gear shifting mechanism.

The prior art is replete with various references for conveniently mounting a tissue dispenser or receptacle where the dispenser is typically positioned above the driver in association with a pivotal sunvisor. A review of such prior art, as reflected in the following U.S. Patents, are products designed solely for convenience and not to aesthetically support a customized sports car, such as a late model CORVETTE. The prior art is as follows:

- a.) U.S. Pat. No. 5,398,856, to Shyu, teaches a tissue rack including a springy mounting plate fastened to the inside rear view mirror of an automobile and the roof thereof, and a rack body welded to the mounting plate for holding a body of tissue. The rack body is made by bending a metal wire into shape, having two front clamping portions and a back clamping portions disposed in parallel for clamping on two opposite sides of the box of tissue paper, and two supporting portions connected between the front and back clamping portions at two opposite sides for supporting the box of tissue paper.
- b.) U.S. Pat. No. 5,332,138, to Gross et al., relates to a tissue container which is mounted to the visor of a vehicle and which can be filled with tissues or a box of tissues without removing the container from the visor. The tissue container has a fairly narrow width so that it takes less head room in smaller vehicles. However, for larger vehicles, an increased number of tissues, which are greater in volume than the volume of the housing of the tissue container, may be inserted in the container. The container is mounted to the visor using elastic cords which stretch to accommodate the increased volume of the tissues or a larger box of tissues inserted in the container which has a greater volume than the volume inside the housing of the container.
- c.) U.S. Pat. No. 5,213,243, to Landon, is directed to a tissue dispenser for a motor vehicle which is molded as an integral part of the interior trim of a motor vehicle in such a manner that no additional hardware is needed. The tissue dispenser is preferably located in a readily accessible location in the interior of the motor vehicle-such as the dashboard, the passenger rear seat arm rest compartment, the center console, the overhead console, or the door.
- d.) U.S. Pat. No. 3,630,343, to Wohl, teaches a tissue dispenser for mounting over the transmission hump between the driver and passenger seat. The dispenser includes a boxlike structure having a removable lid with openings therein to accommodate the housing of a plurality of containers, such as a tissue dispenser, a litter plurality of container, storage boxes, etc. A resilient C-shaped clamp having elongated resilient U-shaped members, is mounted thereon by a resilient clip which is adapted to receive and hold the boxlike member containing its multiple compartments. The mounting and retaining action of the C-shaped clip is particularly suitable for mounting the multiple container holder on top of the tunnel hump of an automobile.
- e.) U.S. Pat. No. 3,414,157, to Wright, is directed to an open top container having a lid hinged thereto and a tissue dispensing opening in its top wall, a tissue package having a tissue dispensing opening in its top wall, and means releasably holding the tissue package in an operative position at the inner side of the lid with the tissue dispensing openings in registration and permitting removal of a used tissue package from said operative position and mounting a refill tissue package in such position when the lid is swung on its hinge to an open position.
- f.) U.S. Pat. No. 3,285,398, to Larkin, relates to a tissue box container for automobiles, where the container includes a saddle pad element secured to its bottom wall and being of an elongate character and having end portions that extend beyond the opposed side walls of the container and which end portions are flexible and weighted so that they will drape downwardly from the bottom of the container to closely hug the top and side walls of the tunnel hump which is a feature of most automobile bodies, whereby the container may sit upon such tunnel hump closely adjacent to the passenger front or rear set of a motor car.
- g.) U.S. Pat. No. 3,258,238, to Grafton, teaches a tissue holder for mounting above the driver or front passenger.
- h.) U.S. Pat No. 3,214,059, to Stark, relates to a tissue dispenser to be mounted snugly to the internal roof of an automobile.

SUMMARY OF THE INVENTION

The invention hereof relates to the combination of a tissue dispenser assembly for a CORVETTE model automobile, where the CORVETTE includes a center console housing featuring a gear shifting mechanism and a pair angularly positioned walls extending from a housing top to the mechanism. The tissue dispenser assembly comprises a generally rectangular housing, having a base and a rear face, for receiving a box of tissues, where said rear face is positioned to lie contiguous with one of the angular walls. Underlying the housing is an adapter secured to the base and positioned to lie contiguous with a second of the angular walls. Finally, at least one attachment member is provided for temporarily securing the housing to the housing top.

Accordingly, an object of this invention is to provide an aesthetically pleasing accessory to a late model CORVETTE in the form of a tissue dispenser assembly.

Another object hereof is the provision of a stylish, yet convenient accessory for a CORVETTE, particularly the model years 1997 to 1999.

These and other objects will become apparent to those skilled in the art from the following description, particularly when read in conjunction with the accompanying drawings.

BRIEF DESCRIPTION OF DRAWINGS

FIG. 2 is a second perspective view of the CORVETTE model tissue dispenser hereof showing the mounted dispenser on an automobile's console housing for use by the driver, for example.

FIG. 3 is a side view of the tissue dispenser of FIG. 2.

FIG. 4 is a side view similar to FIG. 3, further showing a modification to the assembly hereof

DETAILED DESCRIPTION OF PREFERRED EMBODIMENT

Figure 1:
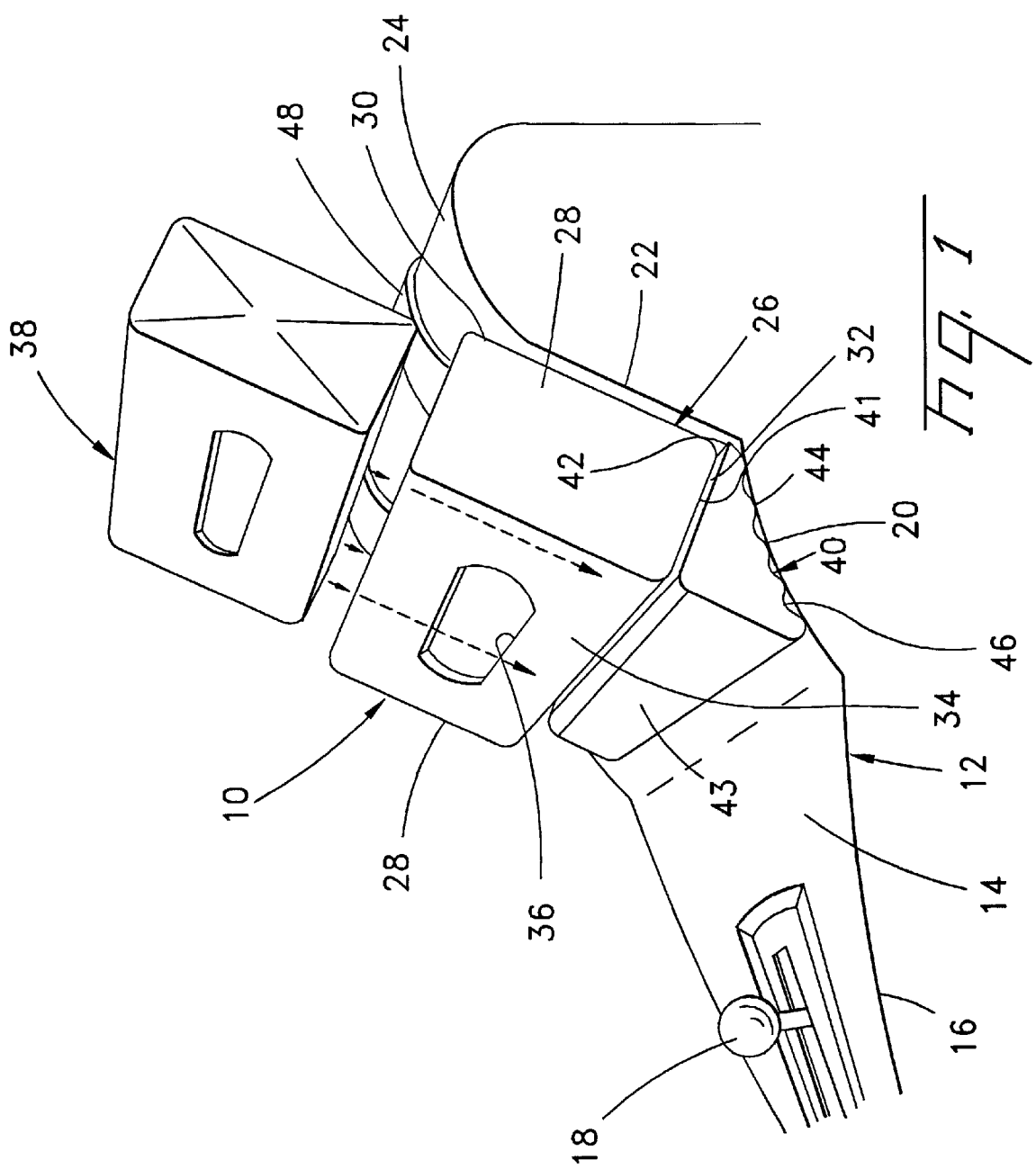
FIG. 1 is a perspective view of the CORVETTE model tissue dispenser according to this invention, further showing the positioning of a tissue box for entry into the dispenser.

The present invention is directed to a tissue dispenser assembly for temporarily securing to the console of a late model CORVETTE, particularly for the model years 1997 to 1999. The tissue dispenser assembly will now be described with reference to the several Figures where like reference numerals represent like components and features throughout the several views.

Turning now to the Figures, there is shown the tissue dispenser assembly 10 temporarily mounted to the console 12 of an automobile, such as a CORVETTE. The center console, as known in the art, comprises a housing 14 featuring a first portion 16, through which the gear shifting mechanism 18 projects, an intermediate angled wall 20, and an upstanding angled wall 22 terminating in a curved top 24.

The tissue dispenser assembly 10 comprise a generally rectangular housing 26 formed by a pair of side walls 28, a rear wall 30, a base 32, and a front face 34, having a tissue dispensing opening 36. While the cross section of the housing may vary, a preferred size is such as to slidably receive a conventional box of tissues 38, as known in the art and readily available at super markets and related type stores.

The housing 26 is supported in part by an adapter 40, generally triangular in cross section. The adapter 40 has an upper face 41 coextensive with the base 32, and secured thereto in a face-to-face relationship, or at least at the rear edges 42 in a hinged fashion, a front face 43, and a support face 44, where the support face 44 is preferably contoured 46 to enhance gripping contact with intermediate angled wall 20.

Further support for the assembly may be provided by one or more relatively rigid C-shaped straps 48, such as formed of aluminum or plastic.

FIG. 4 illustrates a modification to the assembly by the addition of a skirt 50 to cover the joint between the housing 14 and adapter 40. This may be desirable where the angle between the respective walls 20, 22 may vary.

Finally, since the assembly hereof is intended to aesthetically enhance the interior of a CORVETTE, the dispenser assembly 10 and adapter 40 may be covered with leather or other material that matches, simulates, or is compatable with the interior and/or upholstery of the CORVETTE.

It is understood that modifications, changes, and additions may be made to the dispenser assembly of this invention, particularly by those skilled in the art. Accordingly, no limitation is intended to be imposed on this invention, except as set forth in the accompanying claims.

What is claimed is:

1. In combination with a sports type automobile having a center console housing featuring a gear shifting mechanism and a pair of angularly positioned walls extending from a housing top to said mechanism, a tissue dispenser assembly comprising:
   a.) a generally rectangular housing, having a base and a rear face, for receiving a box of tissues, where said rear face is positioned to lie contiguous with one of said angular walls;
   b.) an adapter, triangular in configuration, secured to said base and positioned to lie contiguous with a second of said angular walls; and
   c.) at least one attachment member for temporarily securing said generally rectangular housing to said console housing top.

2. The combination according to claim 1, wherein said rectangular housing includes a front face having an opening therein in communication with the interior of said rectangular housing.

3. The combination according to claim 1, wherein said rectangular housing and adapter are covered in a material to simulate the interior of said sports type automobile.

4. The combination according to claim 1, wherein said rectangular housing includes a peripheral skirt portion about said base, and that said skirt overrides a portion of said adapter.

* * * * *